(12) United States Patent
Friend et al.

(10) Patent No.: US 9,052,391 B2
(45) Date of Patent: Jun. 9, 2015

(54) BACKUP VELOCITY ESTIMATION UTILIZING TRACTION DEVICE SPEED

(75) Inventors: Paul Russell Friend, Morton, IL (US); Drew Alan Fehr, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/564,603

(22) Filed: Aug. 1, 2012

(65) Prior Publication Data

US 2014/0039748 A1 Feb. 6, 2014

(51) Int. Cl.
| | |
|---|---|
| *G01S 19/26* | (2010.01) |
| *G01S 19/49* | (2010.01) |
| *G01S 19/52* | (2010.01) |
| *G01C 21/16* | (2006.01) |
| *G01C 21/28* | (2006.01) |
| *G01P 3/50* | (2006.01) |
| *G06F 11/30* | (2006.01) |

(52) U.S. Cl.
CPC .............. *G01S 19/52* (2013.01); *G01S 19/49* (2013.01); *G01P 3/50* (2013.01); *G01C 21/165* (2013.01); *G01C 21/28* (2013.01); *G01S 19/26* (2013.01); *G06F 11/30* (2013.01)

(58) Field of Classification Search
CPC ......... G01S 19/49; G01S 19/26; G01S 19/45; G01S 19/51; G01S 19/52; G01C 21/185; G01C 21/28; G01P 3/50
USPC .................................. 701/468, 472, 480, 500
See application file for complete search history.

(56) References Cited

U.S. PATENT DOCUMENTS

| | | | |
|---|---|---|---|
| 5,860,480 A | 1/1999 | Jayaraman et al. | |
| 5,917,434 A | 6/1999 | Murphy | |
| 6,408,245 B1 | 6/2002 | An et al. | |
| 6,453,238 B1 * | 9/2002 | Brodie et al. | ................. 701/472 |
| 2008/0109141 A1 | 5/2008 | Nichols et al. | |
| 2010/0222977 A1 * | 9/2010 | Tan et al. | ......................... 701/70 |
| 2011/0307171 A1 * | 12/2011 | Waite | ............................. 701/208 |
| 2012/0029783 A1 * | 2/2012 | Takenaka et al. | ............... 701/73 |
| 2013/0018578 A1 * | 1/2013 | Matsuo et al. | ................. 701/431 |
| 2013/0124058 A1 * | 5/2013 | Perlick et al. | ................... 701/70 |

FOREIGN PATENT DOCUMENTS

| | | |
|---|---|---|
| WO | WO 94/28435 | 12/1994 |
| WO | WO 97/24577 | 7/1997 |
| WO | WO 01/20260 | 3/2001 |

OTHER PUBLICATIONS

Miller et al., Calculating Longitudinal Wheel Slip and Tire Parameters Using GPS Velocity, Jun. 27, 2001, Proceedings from the American Control Conference.*

* cited by examiner

*Primary Examiner* — Fadey Jabr
*Assistant Examiner* — Thomas Ingram
(74) *Attorney, Agent, or Firm* — Finnegan, Henderson, Farabow, Garrett & Dunner, LLP

(57) ABSTRACT

A velocity estimation method and system is disclosed. The method may include receiving a location signal indicative of a location of the machine and estimating the velocity of the machine based on a change in the location of the machine over a period of time. The method may further include determining a loss of the location signal, detecting a traction device speed of the machine, and selectively estimating the velocity of the machine based on the traction device speed when the location signal is determined to be lost.

17 Claims, 3 Drawing Sheets

BACKUP VELOCITY ESTIMATION UTILIZING TRACTION DEVICE SPEED

TECHNICAL FIELD

The present disclosure relates generally to a velocity estimation system and, more particularly, to a backup system for velocity estimation that utilizes traction device speed.

BACKGROUND

Machines such as, for example, dozers, motor graders, wheel loaders, wheel tractor scrapers, and other types of heavy equipment are used to perform a variety of tasks. Remotely controlled, autonomously controlled, and semi-autonomously controlled machines are capable of operating with little or no human input by relying on information received from various machine systems. For example, based on machine movement input, terrain input, and/or machine operational input, a machine can be controlled to remotely and/or automatically complete a programmed task. By receiving appropriate feedback from each of the different machine systems during performance of the task, continuous adjustments to machine operation can be made that help to ensure precision and safety in completion of the task. In order to do so, however, the information provided by the different machine systems should be accurate and reliable. The velocity of the machine is one such parameter whose accuracy may be important for control and positioning of the machine.

To calculate the velocity, conventional machines typically utilize a positioning system, which can be used to determine various operating parameters of the machine such as velocity, pitch rate, yaw rate, roll rate, etc. Conventionally, the positioning system utilizes Global Positioning System (GPS) data along with data from an Inertial Measurement Unit (IMU), which typically includes one or more accelerometers, to calculate velocity. Low cost MEMS accelerometers have error sources such as bias drift that quickly change and, if velocity was calculated solely based on the readings from the accelerometer, the velocity reading will become inaccurate over time. Therefore, conventional positioning systems use a Kalman filter to account for the accelerometer errors by using the GPS velocity measurement, which is fairly accurate.

An exemplary system that may be used to control a machine is disclosed in PCT Publication No. WO 97/24577 to Croyle et al. that published on Jul. 10, 1997 ("the '577 PCT Publication"). The system of the '577 PCT Publication utilizes information from a Global Positioning System (GPS) to obtain velocity vectors, which include speed and heading components, for "dead reckoning" the vehicle position from a previous position. If information from the GPS is not available, then the vehicle navigation system utilizes information from an orthogonal axes accelerometer, such as two or three orthogonally positioned accelerometers, to propagate vehicle position.

Although the system of the '577 PCT Publication may be useful in determining the velocity, the system may not provide accurate velocity when the GPS signal is lost or unavailable for an extended period of time. This is because the readings from the accelerometers drift over time such that the errors accumulate and provide an incorrect velocity reading.

The velocity estimation system of the present disclosure is directed toward solving one or more of the problems set forth above and/or other problems of the prior art.

SUMMARY

In one aspect, the present disclosure is directed to a velocity estimation system. The velocity estimation system may include a locating device configured to generate a first signal indicative of a location of the machine. The system may further include a sensor configured to generate a second signal indicative of a traction device speed of the machine. The system may even further include a controller in communication with the locating device and the sensor. The controller may be configured to receive the first signal from the locating device and the second signal from the sensor, and estimate the velocity of the machine based on a change in the location of the machine over a period of time. The controller may be further configured to determine a loss of the first signal, and selectively estimate the velocity of the machine based on the second signal when the first signal is determined to be lost.

In another aspect, the present disclosure is directed to a method of velocity estimation. The method may include receiving a location signal indicative of a location of the machine and estimating the velocity of the machine based on a change in the location of the machine over a period of time. The method may further include determining a loss of the location signal, detecting a traction device speed of the machine, and selectively estimating the velocity of the machine based on the traction device speed when the location signal is determined to be lost.

In yet another aspect, the present disclosure is directed to a non-transitory computer-readable storage device storing instructions for determining velocity of a machine. The instructions may cause one or more computer processors to receive a location signal indicative of a location of the machine and estimate the velocity of the machine based on a change in the location of the machine over a period of time. The instructions may further cause the processors to determine a loss of the location signal, detect a traction device speed of the machine, and selectively estimate the velocity of the machine based on the traction device speed when the location signal is determined to be lost.

DETAILED DESCRIPTION

Figure 1:
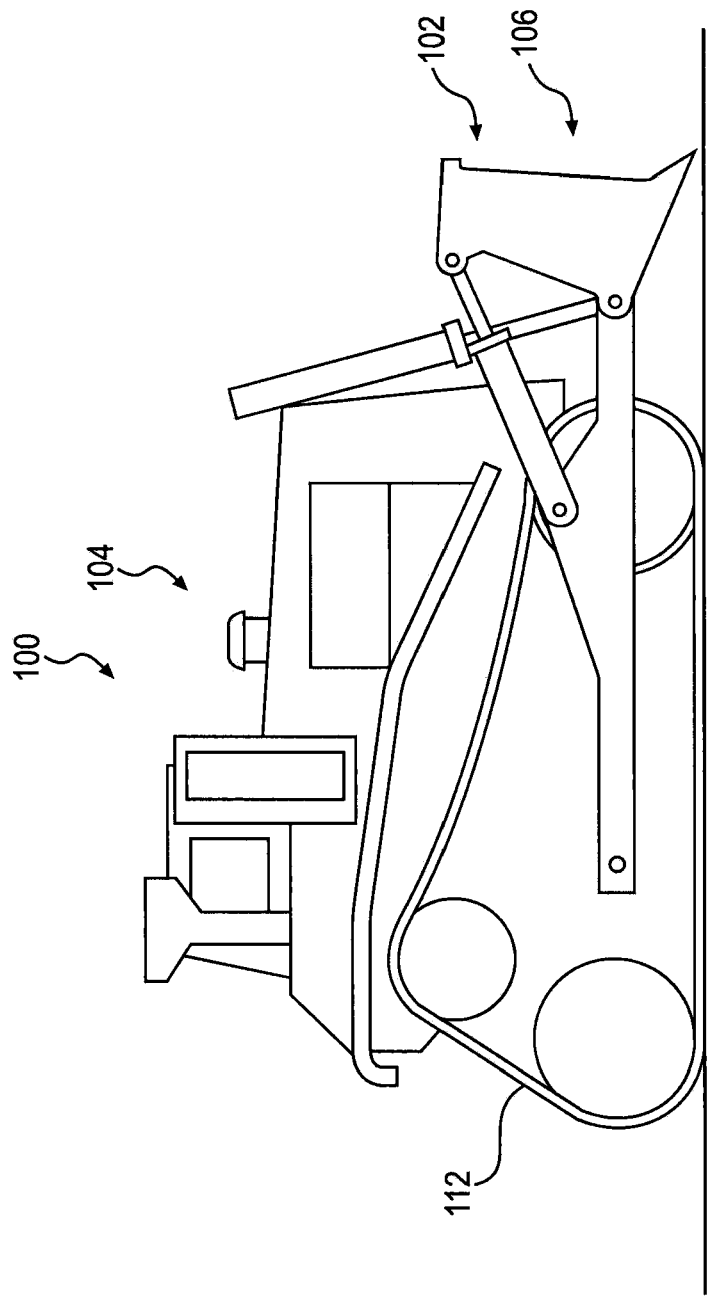
FIG. 1 is a pictorial illustration of an exemplary disclosed machine.

FIG. 1 illustrates a pictorial view of an earth moving machine 100 having an earth moving implement 102. The earth moving implement 102 may be utilized to move earth or soil. For illustrative purposes, the earth moving machine 100 is shown as a track-type bulldozer 104 and the earth moving implement 102 is shown as a bulldozer blade 106. While the present disclosure is described in conjunction with a bulldozer, it is intended that exemplary aspects of the present disclosure will also be used on other types of earth moving machines, such as other track or wheel-type machines.

Machine 100 may generally include a frame that at least partially defines or supports an operator station, one or more engines mounted to the frame, a plurality of traction devices 112 driven by the engine to propel machine 100. Traction devices 112, in the disclosed exemplary embodiments, are tracks located at opposing sides of machine 100. Each track may be independently driven to turn machine 100 or simultaneously and dependently driven to propel machine 100 in a straight direction. It is contemplated that one or all of traction devices 112 may be replaced with another type of traction device, if desired, such as belts or wheels. In these situations, steering of machine 100 may be implemented by pivoting and/or tilting the traction devices, as is known in the art.

Figure 2:
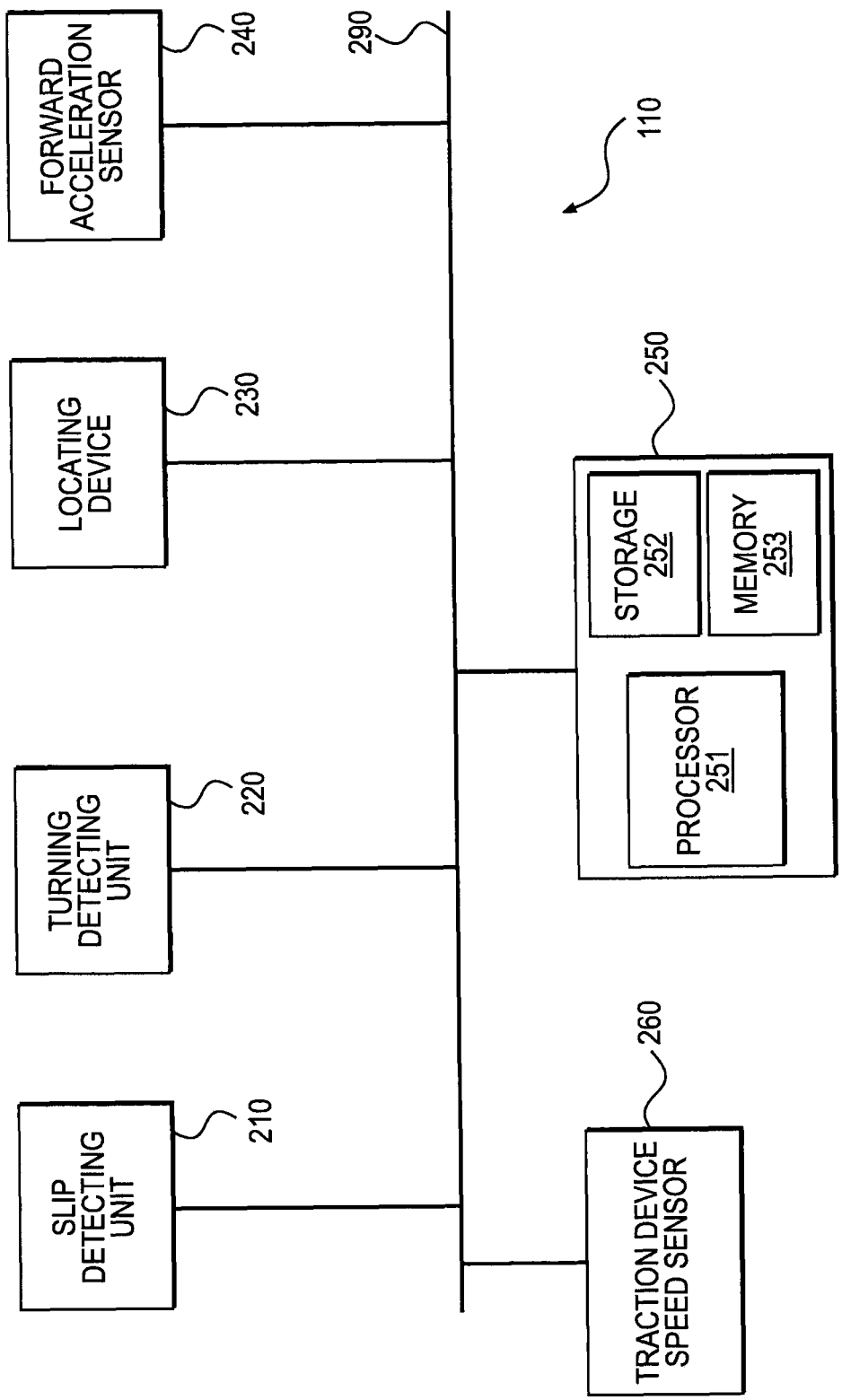
FIG. 2 is a diagrammatic illustration of an exemplary disclosed velocity estimation system that may be used in conjunction with the machine of FIG. 1.

FIG. 2 illustrates an exemplary velocity estimation system 110 that may be used in conjunction with machine 100. Velocity estimation system 110 may include a slip detecting unit 210, a turning detecting unit 220, a locating device 230, a forward acceleration sensor 240, a traction device speed sensor 260, and a controller 250 connected to each other via a bus 290. While a bus architecture is shown in FIG. 2, any suitable architecture may be used, including any combination of wired and/or wireless networks. Additionally, such networks may be integrated into any local area network, wide area network, and/or the Internet.

The slip detecting unit 210 may include any device capable of measuring the amount of slip encountered by the tracks 112 of the machine 100, and producing a corresponding slip signal. For example, the slip detecting unit 210 may include a torque-measuring device, which measures the torque and calculates the slip based on the measured torque. Exemplarily, the slip detecting unit 210 may generate a signal indicative of the slip and the slip may be calculated by the controller 250.

The turning detecting unit 220 may include any device capable of giving an indication regarding whether the machine 100 is turning. For example, the turning detecting unit 220 may embody a yaw rate sensor that outputs a yaw rate signal for the machine 100. Alternatively, the turning detecting unit 220 may include a device that measures the difference in track speed of the right and left tracks 112 of the machine and outputs a differential track speed for the machine 100.

The locating device 230 may include any device capable of providing a signal that indicates the machine's location. For example, the locating device 230 could embody, a global satellite system device (e.g., a GPS or GNSS device), an Inertial Reference Unit (IRU), a local tracking system, a laser range finding device, an odometric or dead-reckoning device, or any other known locating device that receives or determines positional information associated with machine 100. In some embodiments, locating device 230 may additionally include an orientation sensor such as a laser-level sensor, a tilt sensor, an inclinometer, a radio direction finder, a gyrocompass, a fluxgate compass, or another device to facilitate heading and/or inclination detection, if desired. Locating device 230 may be configured to convey a signal indicative of the received or determined positional information to one or more of interface devices for display of machine location, if desired. The signal may also be directed to a controller 250 for further processing. In the exemplary embodiments discussed herein, the locating device 230 provides a GPS signal as the location signal indicative of the location of the machine 100. However, it will be understood by one of ordinary skill in the art that the disclosed exemplary embodiments could be modified to utilize other indicators of the location of the machine 100, if desired.

Forward acceleration sensor 240 may include any device capable of measuring a machine's forward acceleration. For example, forward acceleration sensor 240 may include one or more accelerometers and/or may include hardware and/or software capable of calculating acceleration values for the machine. Exemplarily, the forward acceleration sensor 240 may generate a signal indicative of the acceleration of the machine 100 and the acceleration may be calculated by the controller 250.

The traction device speed sensor 260 may include any device, which provides a signal indicating a traction device speed of the machine 100. For example, the traction device speed sensor 260 may include a device that indicates the track speed of the machine 100 or a device that indicates the wheel speed of the machine 100. In the exemplary embodiments discussed herein, the traction device speed sensor 260 provides a signal indicating the track speed of the machine 100 as the traction device speed of the machine 100. However, it will be understood by one of ordinary skill in the art that the disclosed exemplary embodiments could be modified to utilize a wheel speed of the machine as the traction device speed of the machine 100.

Controller 250 may include a processor 251, a storage 252, and a memory 253, included together in a single device and/or provided separately. Processor 251 may include one or more known processing devices, such as a microprocessor from the Pentium™ or Xeon™ family manufactured by Intel™, the Turion™ family manufactured by AMD™, any of various processors manufactured by Sun Microsystems, or any other type of processor. Memory 253 may include one or more storage devices configured to store information used by controller 250 to perform certain functions related to disclosed embodiments. Storage 252 may include a volatile or nonvolatile, magnetic, semiconductor, tape, optical, removable, nonremovable, or other type of storage device or computer-readable medium. Storage 252 may store programs and/or other information, such as information related to processing data received from one or more sensors, as discussed in greater detail below.

Figure 3:
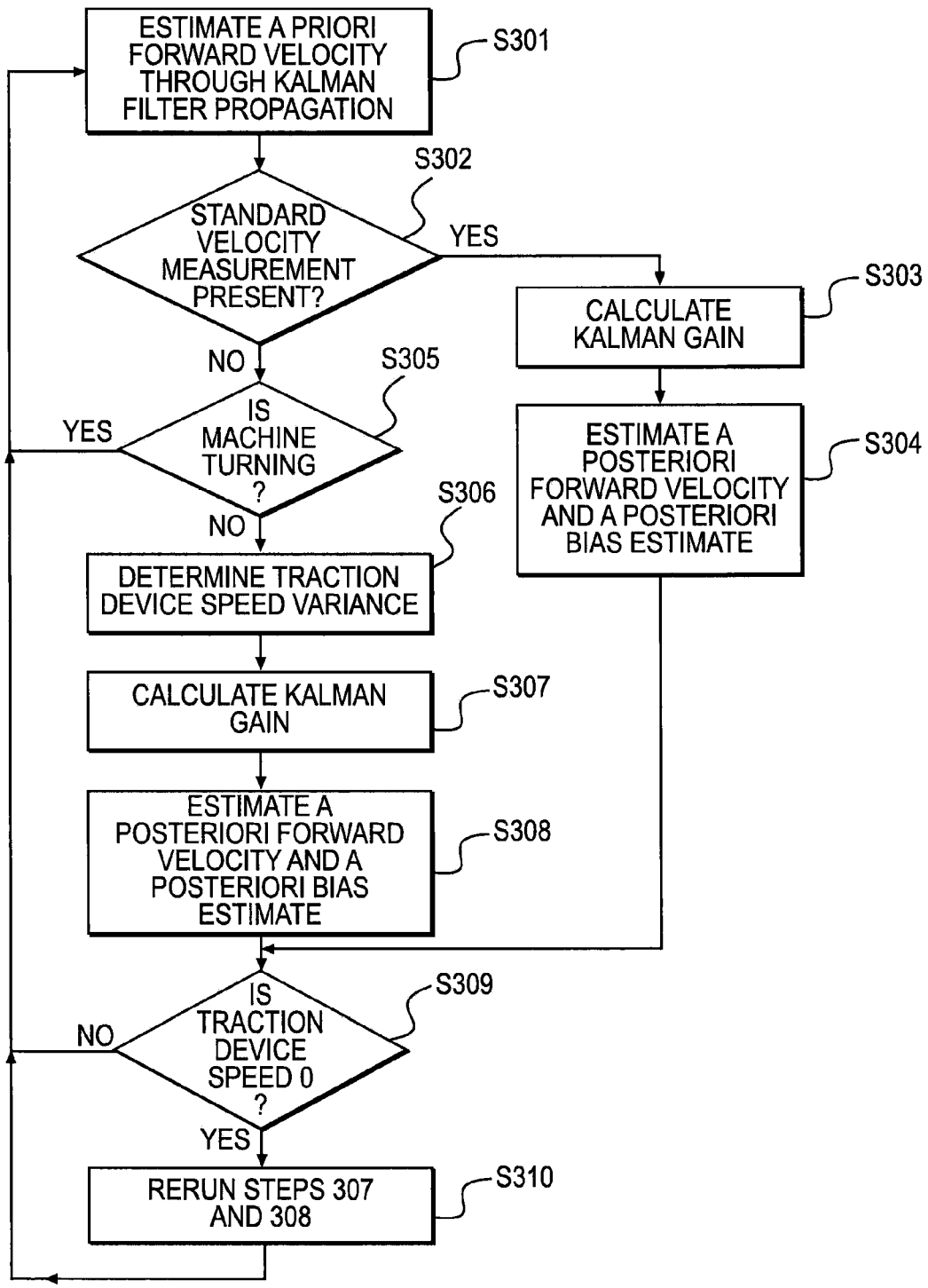
FIG. 3 is a flowchart depicting an exemplary disclosed method performed by the velocity estimation system of FIG. 2.

In one exemplary embodiment, memory 253 may include one or more velocity estimation programs or subprograms loaded from storage 252 or elsewhere that, when executed by processor 251, perform various procedures, operations, or processes consistent with disclosed embodiments. For example, memory 253 may include one or more programs that enable the controller 250 to, among other things, collect data from the above-mentioned units and process the data according to disclosed embodiments such as those embodiments discussed with regard to FIG. 3, and determine a velocity of the machine 100 based on the processed data.

In certain embodiments, memory 253 may store program enabling instructions that configure the controller 250 to implement a Kalman filter and estimate the bias of the accelerometer in the forward acceleration sensor 240 and the forward velocity of the machine. A Kalman filter is a mathematical method that may be used to determine accurate values of measurements observed over time, such as measurements taken in a time series. The Kalman filter's general operation involves two phases, a propagation or "predict" phase and a measurement or "update" phase. In the predict phase, the value estimate from the previous timestep in the time series is used to generate an a priori value estimate. In the update phase, the a priori estimate calculated in the predict phase is combined with an estimate of the accuracy of the a priori estimate (e.g., the variance), and a current measurement value to produce a refined a posteriori estimate.

In certain exemplary embodiments, the controller 250 may be configured to utilize the following equations in its calculations. For the propagation or "predict" phase, the controller 250 may be configured to utilize the following generic equations:

$$\hat{x}_k^- = F_{k-1}\hat{x}_{k-1} + G_{k-1}u_{k-1} \qquad (1)$$

$$P_k^- = F_{k-1}P_{k-1}^+ F_{k-1}^T + Q_{k-1} \qquad (2)$$

For the measurement or "update" phase, the controller 250 may be configured to utilize the following generic equations:

$$K_k = P_{k-1}^- H^T(H_k P_{k-1}^- H_k^T + R_k)^{-1} \qquad (3)$$

$$\hat{x}_k^+ = \hat{x}_k^- + K_k(y_k - H_k \hat{x}_k^-) \quad (4)$$

$$P_k^+ = (I - K_k H_k) P_k^- \quad (5)$$

In the above equations, the following state transition matrices may be utilized:

$$x_k = \begin{bmatrix} 1 & -dt \\ 0 & 1 \end{bmatrix} \begin{bmatrix} vel \\ bias \end{bmatrix} + \begin{bmatrix} dt \\ 0 \end{bmatrix} [accel] + w_{k-1} \quad (6)$$

$$y_k [1 \ 0] \begin{bmatrix} vel \\ bias \end{bmatrix} + v_k \quad (7)$$

In the above equations, Q is a process noise matrix, w is the process noise, and v is the measurement noise. Further, in the above equations, $$F = \begin{bmatrix} 1 & -dt \\ 0 & 1 \end{bmatrix}$$

$$G = \begin{bmatrix} dt \\ 0 \end{bmatrix}$$

$$H = [1 \ 0]$$

Given the above generic equations, the controller 250 may calculate an a priori estimated velocity of the machine based on a previously estimated velocity. For example, the controller 250 may receive a velocity $\hat{V}$ and an acceleration bias estimate $\hat{\beta}_A$ calculated in an immediately preceding timestep. The controller 250 may also receive an acceleration value A, e.g., from forward acceleration sensor 240. In certain embodiments, the acceleration value received from the forward acceleration sensor 240 may have been refined to remove the acceleration due to gravity. The controller 250 may then use the received data to calculate an a priori estimated velocity of the machine using equations (1) and (6). For example, the controller 250 may set vel=$\hat{V}$, bias=$\hat{\beta}_A$, and accel=A in equation (6) to calculate the a priori state estimate $\hat{x}_k^-$ which is a combination of the a priori estimated velocity and the a priori bias estimate. In particular, the a priori estimated forward velocity portion of $\hat{x}_k^-$ may be represented by the following equation, which can be readily derived from equations (1) and (6):

$$\hat{V}^- = \hat{V} + (A - \hat{\beta}_A) \Delta T \quad (8)$$

where $\hat{V}^-$ equals the a priori estimated velocity, $\hat{V}$ equals the estimated velocity from the immediately preceding time step, A equals the acceleration value, $\hat{\beta}_A$ equals the acceleration bias estimate from the immediately preceding time step, and $\Delta T$ equals the time between timesteps in the Kalman filter. While a linear extrapolation method is used above in equation (8), any other method may be used to calculate the a priori estimated velocity, including, e.g., curve fitting analysis, regression analysis, estimates based on previously collected data, etc.

The above calculation for the a priori state estimate $\hat{x}_k^-$ may be performed in the propagation or "predict" phase. In the "predict" phase, the controller 250 may also calculate an a priori estimate error covariance $P_k^-$ using equation (2).

In the measurement or "update" phase, the controller 250 may calculate an updated bias estimate for the accelerometer and an a posteriori estimated velocity using equations (3), (4), and (5). To perform these calculations, the controller 250 may utilize a velocity measurement and a variance for the velocity measurement. The velocity measurement may be either based on the location signal received from the locating device 230 or the track speed indication received from the traction device speed sensor 260. If the controller 250 utilizes the location signal received from the locating device 230, for example, a GPS signal received from the locating device 230, the controller 250 may calculate the velocity of the machine based on a change in the location of machine indicated by the location signal over a period of time.

The controller 250 may be configured to use the track speed from the traction device speed sensor 260 only when a reliable output from the locating device 230 is not available. For example, if the controller 250 was unable to calculate the velocity because the GPS signal from locating device 230 was unavailable, the controller 250 may use the track speed from the traction device speed sensor 260. The track speed matches fairly well the velocity of the machine except when the machine is slipping. Specifically, the availability of the track speed measurement during the absence of the GPS signal may allow for a better measurement of the velocity of the machine 100.

If the controller 250 utilizes the track speed measurement as the velocity measurement, the controller 250 may be further configured to calculate a track speed variance $R_V$. The track speed variance may be calculated in any way consistent with disclosed embodiments. For example, in one embodiment, the track speed variance may be calculated to be proportional to the estimated track speed slip of the machine 100. Exemplarily, the track speed variance may be calculated as proportional to a square of the track speed slip. The track speed slip may be input from slip detecting unit 210 or the controller 250 may calculate the track speed slip utilizing a signal received from the slip detecting unit 210 that is indicative of the track speed slip. The track speed variance is calculated because the track speed does not always match the true forward velocity of the machine 100. For example, when the machine 100 is slipping, the track speed of the machine 100 may not be the same as the actual velocity of the machine 100 and, hence, the track speed variance may be set higher. Under certain conditions, the track speed variance $R_V$ may be set to a predefined low value. For example, when the absolute value of the a priori estimated velocity (i.e., the velocity estimated using the acceleration) is greater than the absolute value of the track speed, a predefine low variance (i.e., a higher weight) may be assigned to the track speed. Such a condition may occur when the machine 100 is on hard rock and the machine 100 is jumping up and down such that the accelerometer reading suggests a high velocity, but the machine 100 has not moved much. In such a condition, the track speed is a more accurate measurement of the true horizontal velocity and hence, is assigned a lower variance.

If the controller 250 utilizes the velocity measurement calculated based on the GPS signal from the locating device 230, a variance for the calculated velocity measurement is also calculated. For purposes of simplicity, this velocity measurement is calculated based on the GPS signal from the locating device will be referred to hereinafter as GPS velocity.

Once the controller 250 determines the velocity measurement it will utilize and the corresponding variance, the controller 250 may calculate the Kalman gain $K_k$ utilizing equation (3). In equation (3), $P_{k-1}^-$ refers to the a priori estimate error covariance from the previous timestep and $R_k$ refers to the variance for the corresponding velocity measurement. For example, if the track speed is utilized by the controller 250 as the velocity measurement, the track speed variance $R_V$ may be utilized for $R_k$.

Having calculated the Kalman gain, the controller 250 may be configured to determine a measurement $y_k$ using equation (7), where the selected velocity measurement (the GPS velocity or the track speed from the traction device speed sensor 260) is set as vel. Utilizing the a priori estimate $\hat{x}_k^-$ from the "predict" phase, measurement $y_k$, and the Kalman gain $K_k$, the controller 250 may calculate the a posteriori state estimate $\hat{x}_k^+$ using equation (4). The a posteriori state estimate $\hat{x}_k^+$ provides the a posteriori estimated velocity of the machine as well as the a posteriori bias estimate for the accelerometer. At this time, the controller 250 may also calculate the a posteriori estimate error covariance $P_k^+$ by utilizing equation (5). In equation (5), I refers to the identity matrix and $P_k^-$ refers to the a priori estimate error covariance from the "predict" phase.

Further, the controller 250 may run the "update" phase again, if it determines that the track speed is zero, implying that the machine 100 is stopped.

While exemplary embodiments discussed above illustrate distinct units, such as the slip detecting unit 210, turning detecting unit 220, controller 250, etc., one of ordinary skill in the art will understand that one or more of these units or at least functional aspects thereof may be combined into a single unit. Also, while exemplary embodiments discussed above measure forward velocity and acceleration, one of skill in the art will understand that these embodiments may also be used to measure velocity, acceleration, inclination angle, and inclination angular rate of change in any direction. For example, certain embodiments may use a similar process to estimate roll, roll rates, yaw, and yaw rates of a machine. In one embodiment, velocity may be estimated in multiple directions on a single machine.

Industrial Applicability

The disclosed velocity estimation system 110 may be applicable to any machine where accurate detection of the machine's velocity is desired. The disclosed velocity estimation system may provide for improved detection of a machine's velocity through the use of a Kalman filter approach that takes into account the track speed of the machine 100 when a reliable ground speed input becomes unavailable. The operation of the velocity estimation system 110 will now be described in connection with the flowchart of FIG. 3.

In step 301, the controller 250 may determine the estimated forward velocity through Kalman filter propagation. This step corresponds to the "predict" phase discussed above, in which the controller 250 may calculate the a priori estimated velocity $\hat{V}^-$ of the machine 100 based on a previously estimated velocity. That is, the controller 250 may receive an estimated velocity $\hat{V}$ and acceleration bias estimate $\hat{\beta}_A$ calculated in a previous timestep, and an acceleration value A, e.g., from forward acceleration sensor 240. The controller 250 may then calculate the a priori state estimate $\hat{x}_k^-$, which is a combination of the a priori estimated velocity and the a priori estimated bias, by utilizing equations (1) and (6). The controller 250 may also calculate the a priori estimate error covariance $P_k^-$ using equation (2) in this step.

Next, in step 302, the controller 250 may determine whether a standard velocity measurement is present. Specifically, the controller 250 may determine whether it is possible to calculate a GPS velocity. The controller 250 may make this determination by determining whether a reliable GPS signal is available from the locating device 230. For example, the controller 250 may determine that a reliable GPS signal is not available if the controller 250 determines that the machine 100 does not receive a GPS signal for a predetermined period of time. Exemplarily, the predetermined period of time may be in the range of 20 ms thru 1 second.

If the controller 250 determines in step 302 that a reliable GPS signal is available from the locating device 230, the controller 250 may proceed to steps 303 and 304. In steps 303 and 304, the controller 250 may utilize the GPS velocity calculated based on the GPS signal from the locating device 230 and the a priori estimated velocity $\hat{V}^-$ from step 301 to calculate the a posteriori estimated velocity and the a posteriori estimated acceleration bias $\hat{\beta}_A$ of the accelerometer in the forward acceleration sensor 240. These steps corresponds to the "update" phase with the GPS velocity as the velocity measurement. In step 303, the controller 250 may utilize equation (3) and set the variance for the GPS velocity as $R_k$ to calculate the Kalman gain $K_k$. Having calculated the Kalman gain, the controller 250 may proceed to step 304 and determine measurement $y_k$ utilizing equation (7) where the GPS velocity is set as vel. Utilizing measurement $y_k$, the Kalman gain $K_k$, and the a priori estimate $\hat{x}_k^-$ from the "predict" phase, the controller 250 may calculate the a posteriori state estimate $\hat{x}_k^+$ using equation (4). The a posteriori state estimate $\hat{x}_k^+$ provides the a posteriori estimated forward velocity of the machine 100 as well as the a posteriori bias estimate for the accelerometer. At this time, the controller 250 may also calculate the a posteriori estimate error covariance $P_k^+$ by utilizing equation (5). In equation (5), I refers to the identity matrix and $P_k^-$ refers to the a priori estimate error covariance from the "predict" phase.

If the controller 250 determines in step 302 that a standard velocity measurement is not present, i.e., the controller 250 exemplarily determines that it may not be possible to determine the GPS velocity because a reliable GPS signal is not available from the locating device 230, the controller 250 may proceed to utilize the track speed from the traction device speed sensor 260. However, prior to utilizing the track speed, the controller 250 may determine in step 305 whether the machine 100 is turning. If the machine 100 is turning, the track speed may not be a good indicator of the ground speed, because the track speed will provide the speed of the outer track of the turn radius while the other track is clutched. Also, a lot of slip can occur while turning. To determine whether the machine 100 is turning, the controller 250 may utilize the output from the turning detecting unit 220. For example, if the turning detecting unit 220 outputs a yaw rate calculated by a yaw rate sensor, the controller 250 may determine whether the machine is turning by determining whether the yaw rate exceeds a predetermine threshold. Exemplarily, if the yaw rate is greater than about 3 deg/sec, the controller 250 may determine that the machine 100 is turning. Alternatively, if the turning detecting unit 220 outputs a differential track speed of the right and left tracks 112 of the machine 100, the controller 250 may determine that the machine 100 is turning if the differential track speed exceeds a predetermined threshold.

If the controller 250 determines in step 305 that the machine 100 is turning, the controller 250 may return to step 301 and estimate the forward velocity by integrating the output of the accelerometer. If the controller 250 determines in step 305 that the machine 100 is not turning, the controller 250 may proceed to step 306 and determine the traction device speed variance (in this exemplary embodiment, the track speed variance $R_V$). The track speed variance may be calculated in any way consistent with the disclosed exemplary embodiments. For example, in one embodiment, the track speed variance may be calculated to be proportional to the estimated track speed slip of the machine 100. Exemplarily, the track speed variance may be calculated as proportional to a square of the track speed slip. The track speed slip may be input from the slip detecting unit 210. Under certain conditions, the controller 250 may set the track speed variance $R_V$ to a predefined low value. For example, when the absolute value of the a priori estimated velocity (i.e., the velocity estimated using the acceleration) is greater than the absolute value of the track speed, a predefined low variance (i.e., a higher weight) may be assigned to the track speed.

Next, in step 307, the controller 250 may update the Kalman filter and calculate the Kalman gain utilizing the track speed variance $R_V$ calculated in the previous step. Specifically, the controller 250 may calculate the Kalman gain $K_k$ utilizing equation (3) and the track speed variance $R_V$.

Having calculated the Kalman gain, the controller 250 may proceed to step 308 and determine measurement $y_k$ utilizing equation (7) where the ground speed from the traction device speed sensor 260 is set as vel. Utilizing the a priori estimate $\hat{x}_k^-$ from the "predict" phase, the measurement $y_k$, and the Kalman gain $K_k$, the controller 250 may calculate the a posteriori state estimate $\hat{x}_k^+$ using equation (4). The a posteriori state estimate $\hat{x}_k^+$ provides the a posteriori estimated forward velocity of the machine, as well as the a posteriori bias estimate for the accelerometer. At this time, the controller 250 may also calculate the a posteriori estimate error covariance $P_k^+$ by utilizing equation (5).

Next, in step 309, the controller 250 may determine whether the track speed from the traction device speed sensor 260 equals zero. Exemplarily, the controller 250 may determine that the track speed is zero if the traction device speed sensor 260 indicates a zero track speed for a predetermined period of time.

If it is determined in the step 309 that the track speed is not zero, the controller 250 may return to step 301 for a next cycle of velocity estimation. However, if it is determined in step 309 that the track speed is zero, the controller 250 may rerun the "update" phase in step 310. Exemplarily, the controller 250 may set a predefined low variance value for the track speed and perform the calculations discussed in steps 307 and 308. Having rerun the "update" phase, the controller 250 may return to step 301 for a next cycle of velocity estimation.

The process may continue to repeat in this manner until receiving instructions to stop or until new data ceases to be collected from the machine.

The disclosed exemplary embodiments for the velocity estimation system and method for estimating velocity may allow for accurate calculation of the velocity of the machine by utilizing the track speed under certain conditions for the Kalman filter update. Specifically, the availability of the track speed measurement during the absence of a reliable GPS velocity (such as the unavailability of a GPS velocity due to an absence of a GPS signal) may allow for a better measurement of the velocity of the machine, as opposed to conventional systems in which the velocity in the absence of the GPS signal is obtained by integrating the output of the accelerometer that is subject to drift over time.

It will be apparent to those skilled in the art that various modifications and variations can be made to the disclosed velocity estimation system. Other embodiments will be apparent to those skilled in the art from consideration of the specification and practice of the disclosed velocity estimation system. It is intended that the specification and examples be considered as exemplary only, with a true scope being indicated by the following claims and their equivalents.

What is claimed is:

1. A method of estimating velocity of a machine, comprising:
   receiving, from a locating device, a location signal indicative of a location of the machine;
   estimating, by a processor, the velocity of the machine based on a change in the location of the machine indicated by the received location signal over a period of time;
   determining, by the processor, a loss of the location signal;
   detecting, by the processor, a traction device speed of the machine;
   detecting, by the processor, an acceleration of the machine;
   detecting, by the processor, steering of the machine;
   determining, by the processor, whether the traction device speed is unreliable, wherein the traction device speed is determined as unreliable when the detected steering exceeds a predetermined threshold; and
   when the location signal is determined to be lost and the traction device speed is determined to be unreliable, estimating, by the processor, the velocity of the machine based on the detected acceleration.

2. The method of claim 1, wherein the location signal is a GPS signal.

3. The method of claim 1, wherein the traction device speed is a track speed of the machine.

4. The method of claim 1, further including:
   when the location signal is determined to be lost and the traction device speed is determined as not unreliable, estimating the velocity of the machine based on a detected traction device speed slip.

5. The method of claim 1, wherein the velocity of the machine is calculated using a Kalman filter.

6. The method of claim 5, further including:
   detecting, by the processor, a measurement variance for the traction device speed; and
   utilizing, by the processor, the measurement variance as an input to the Kalman filter to estimate the velocity of the machine.

7. A velocity estimation system for a machine, comprising:
   a locating device configured to generate a first signal indicative of a location of the machine;
   a sensor configured to generate a second signal indicative of a traction device speed of the machine; and
   a controller in communication with the locating device and the sensor, the controller configured to:
   receive the first signal from the locating device and the second signal from the sensor;
   estimate the velocity of the machine based on a change in the location of the machine indicated by the first signal over a period of time;
   determine a loss of the first signal;
   detect a traction device speed of the machine based on the received second signal;
   detect an acceleration of the machine;
   detect a steering of the machine;
   determine whether the traction device speed is unreliable, wherein the traction device speed is determined as unreliable when the detected steering exceeds a predetermined threshold; and
   when the location signal is determined to be lost and the traction device speed is determined to be unreliable, estimate the velocity of the machine based on the detected acceleration.

8. The velocity estimation system of claim 7, wherein the first signal is a GPS signal.

9. The velocity estimation system of claim 7, wherein the traction device speed is a track speed of the machine.

10. The velocity estimation system of claim 7, further including:
    a forward acceleration sensor configured to detect the acceleration of the machine,
    wherein the controller is further configured to estimate the velocity of the machine based on a detected traction device speed slip when the location signal is determined to be lost and the traction device speed is determined as not unreliable.

11. The velocity estimation system of claim 7, wherein the velocity of the machine is calculated using a Kalman filter.

12. The velocity estimation system of claim 11, wherein the controller is further configured to:
   detect a measurement variance for the traction device speed; and
   utilize the measurement variance as an input to the Kalman filter to estimate the velocity of the machine.

13. A non-transitory computer-readable storage medium storing instructions for estimating velocity of a machine, the instructions causing one or more computer processors to perform operations comprising:
   receiving, from a locating device, a location signal indicative of a location of the machine;
   estimating the velocity of the machine based on a change in the location of the machine indicated by the received location signal over a period of time;
   determining a loss of the location signal;
   detecting a traction device speed of the machine;
   detecting an acceleration of the machine;
   detecting a steering of the machine;
   determining whether the traction device speed is unreliable, wherein the traction device speed is determined as unreliable when the detected steering exceeds a predetermined threshold; and
   when the location signal is determined to be lost and the traction device determined to be unreliable, estimating the velocity of the machine based on the detected acceleration.

14. The non-transitory computer-readable storage medium of claim 13, wherein the location signal is a GPS signal and the traction device speed is a track speed of the machine.

15. The non-transitory computer-readable storage medium of claim 13, wherein the operations further include:
   when the location signal is determined to be lost and the traction device speed is determined to be not unreliable, estimating the velocity of the machine based on a detected traction device speed slip.

16. The non-transitory computer-readable storage medium of claim 13, wherein the velocity of the machine is calculated using a Kalman filter.

17. The non-transitory computer-readable storage medium of claim 16, wherein the operations further include:
   detecting a measurement variance for the traction device speed; and
   utilizing the measurement variance as an input to the Kalman filter to estimate the velocity of the machine.

* * * * *